Figure 1:
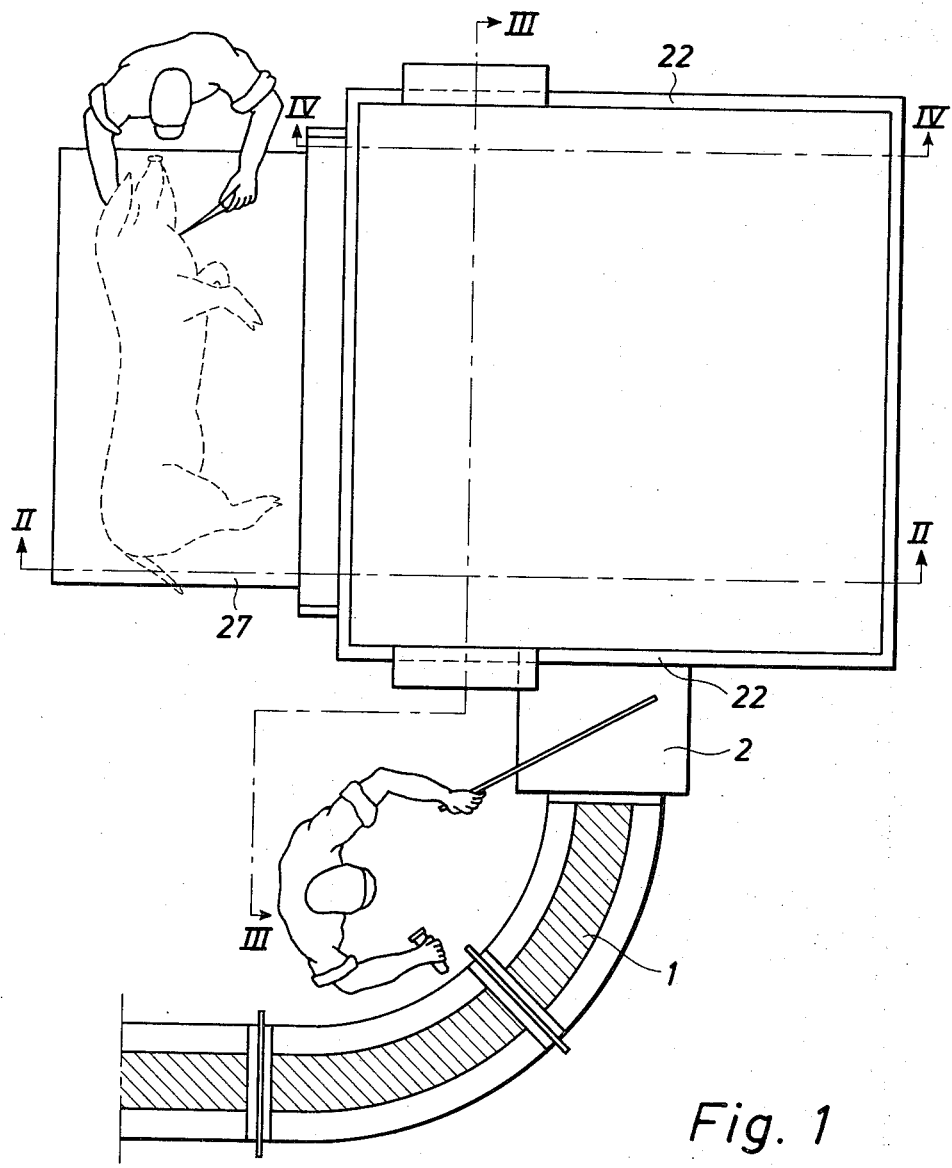

United States Patent [19]

Wernberg

[11] 3,828,396

[45] Aug. 13, 1974

[54] ANAESTHESIA PLANT FOR ANIMALS TO BE SLAUGHTERED

[76] Inventor: Niels-Erik B. Wernberg, Teglvaerksgade 37, 2100 Copenhagen O, Denmark

[22] Filed: May 4, 1972

[21] Appl. No.: 250,164

[30] Foreign Application Priority Data
May 4, 1971 Denmark............................ 2149/71

[52] U.S. Cl. .................................... 17/1 R, 17/1 A
[51] Int. Cl. ............................................. A22b 3/08
[58] Field of Search.................. 17/1 R, 1 A, 45, 24

[56] References Cited
UNITED STATES PATENTS

| | | | |
|---|---|---|---|
| 2,733,477 | 2/1956 | Murphy................................. | 17/1 R |
| 2,737,683 | 3/1956 | Regensberger....................... | 17/1 R |
| 3,118,174 | 1/1964 | Hughes ............................. | 17/1 R X |
| 3,657,770 | 4/1972 | Wallace ............................ | 17/1 R X |

Primary Examiner—Hugh R. Chamblee
Assistant Examiner—D. L. Weinhold
Attorney, Agent, or Firm—Cushman, Darby & Cushman

[57] ABSTRACT

It is known to slaughter hogs in an anaesthesia plant in which the hogs are hanging in traps shaped as troughs suspended in a two-chained paternoster elevator leading the troughs through a pit-shaped gas chamber. The trap has a tiltable side wall permitting the animal to be taken out from the plant in the vicinity of the entrance of the plant.

It is now suggested to arrange a gable at each end of each trap, said gable being suspended in the elevator and being always kept in a vertical position. In each pair of gables the trap is suspended in its entirety on pivots in the one side of the gables in its active position the trap rests against fixed stops on the other side of the gables. The animal is delivered by turning the trap over pivots mentioned.

8 Claims, 5 Drawing Figures

ANAESTHESIA PLANT FOR ANIMALS TO BE SLAUGHTERED

The invention relates to an anaesthesia plant for animals to be slaughtered, preferably for hogs, and is of the kind which consists of a two-chained paternoster elevator, which discontinuously conveys the animals hanging in gondolas formed like troughs through a pit-shaped gas chamber and delivers the animals anaesthetized beside the entrance. Such plants are called compact plants because they can be served by a single man who partly lets in the animals in the plant through an entrance gate, partly takes out the animals anaesthetized, which he sticks and hangs up in a conveyor chain so that the animals bleed to death without regaining consciousness.

In the case of the familiar plants the trap has a tiltable side-wall permitting the animal to be taken out.

The purpose of the invention is partly to produce a more rigid design of the trap, partly to ensure an automatic opening and closing of this, and finally to achieve a safe delivery of the animal anaesthetized right outside the plant.

The plant according to the present invention is characterized therein that each trap like a gondola is suspended in its entirety on pivots on the one side of each of a pair of gables, said gables being constantly held in a vertical position, and each gable being suspended in one out of two elevator chains. The trap is a rigid trough-shaped frame construction, and this can in its entirety by means for controlling its angular position in space be swung sidewards to a position in which it will deliver the animal anaesthetized at a substantially greater distance from the paternoster elevator than in the case of the known plants where it is only the one trough side which is capable of being swung out.

According to the invention, each gable can, besides the pivots have fixed stops to support the gondola in its active position.

These support stops may expediently be placed in the frames opposite the pivots whereby the gondola is evenly supported on each side of the animal.

The fact that the gondola in its entirety is pivotal renders it possible to control both its swinging out and its back swing to its active position automatically in the plant, making it easier for the person or persons attending to this.

Thus, according to the invention, the firm guide determining the position of the gondola, when in the delivery position, may have the form of a pocket engaged by the pivot of the gondola at the motion of the trap towards the highest position of its path, whereby the gondola, as a result of its pivot falling out into the pocket, is swung out for the delivery of the animal anaesthetized, whereafter as a consequence of the motion of the gondola the pivot is again drawn out from the pocket and following firm guides turns the gondola upwards to its active position immediately before it reaches its initial position.

Instead of providing each trap with a trapdoor, which has been suggested made in one piece with the swinging trough half, it is possible, in the case of the plant according to the invention, to use a single gangway common for all the gondolas, and placed off the entrance gate of the plant and serving in a horizontal position as a floor in the gondola in the initial position facing the entrance gate whereby the animal can step into the trap, whereas the said gangway at the closing of the entrance gate, is made to tip downwards so that the animal is lowered and comes to rest with its flanks against the sides of the trough-shaped gondola and losing its footing is held as in a trap.

Besides simplifying the plant, the gangway of this plant provides a smoother motion of the animal at its fixing in the gondola and ensures that the fixing takes place during the stop of the gondola so that the animal prior to the fixing will not be alarmed by the start of the motion of the trap to its next position.

The advantages explained above and being achieved by the insertion of the gables between the trap proper, i.e., the gondola and the elevator chains, must not be lost or reduced through an incorrect or unstable motion of the gables. This is prevented thereby that according to the invention the gables preferably at their lower parts, carry pivots following guides firm on the inside of the wall of the chamber itself so that the gables during the whole cycle are kept in a vertical position having no possibility of tilting around their suspension axes.

For simplification of the moveable parts of the plant, it is possible, according to the invention, to use a gangway common for all the gondolas, placed opposite the entrance gate of the plant, and which only in its horizontal position has the effect of a floor for each gondola stopping opposite the entrance gate to receive an animal, and which later at the closing of the entrance gate is made to tip downwards so that the animal is lowered and comes to rest with its flanks against the sides of trough-shaped gondola whereby the animal losing its footing is fixed as in a trap.

To achieve the maximum economy with the anaesthetic gas, and to ensure that a minimum of gas is escaping from the plant into the room in which the plant is erected, it is possible to use, according to the invention, gas escape openings, placed along the travel of the heads of the animals, which openings are automatically fed with a dose of gas, preferably carbon dioxide, at the entrance of each animal into the plant.

The gondolas and the animals will during their conveyance through the pit exert a certain shoveling effect on the gas, for which reason it is advantageous to feed it at the same end of the pit as the animals. Moreover, the gas is fed proportionally to the number of animals passing the plant for a certain period of time, i.e., to the consumption.

According to the invention, the gas escape openings can be arranged in a tube which is a part of or is built together with that part of the firm guide of the gable pivots which is in that side of the chamber in which the gondolas move downwards.

The animals are exposed to a considerable gas concentration immediately at the first positions after the entrance position and it will be a simplification of the plant to use the gas tube for guiding purposes.

The plant can, according to the invention, be so arranged that the openings preferably are located at the places in the chamber where the heads of the animals are positioned in the stopping periods of the elevator.

Through this the animals become already at the first positions exposed to a gas concentration so that the anaesthesia starts at the earliest possible moment.

The drawing shows an embodiment of the plant according to the invention.

Figure 2:
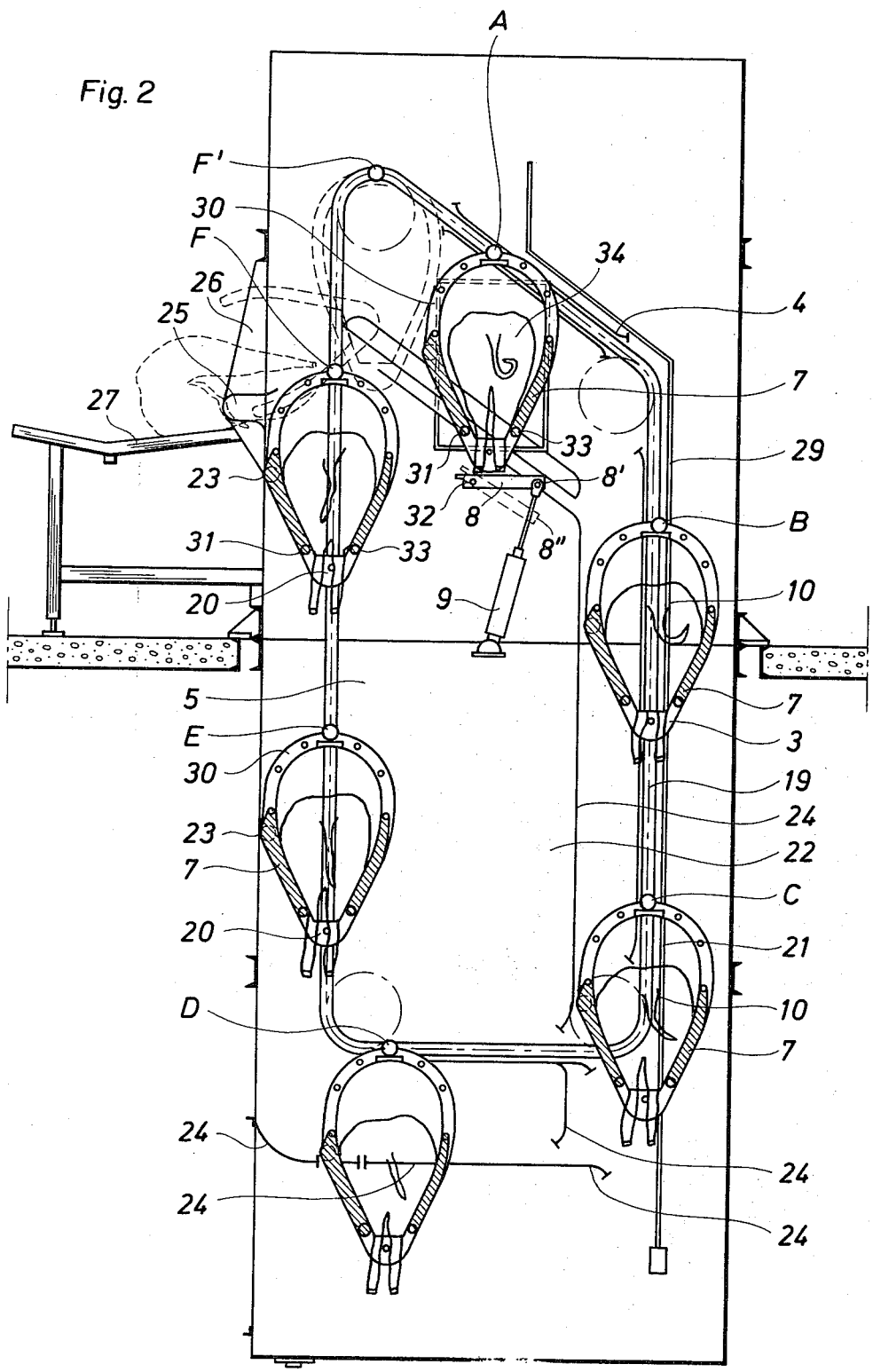
Figure 3:
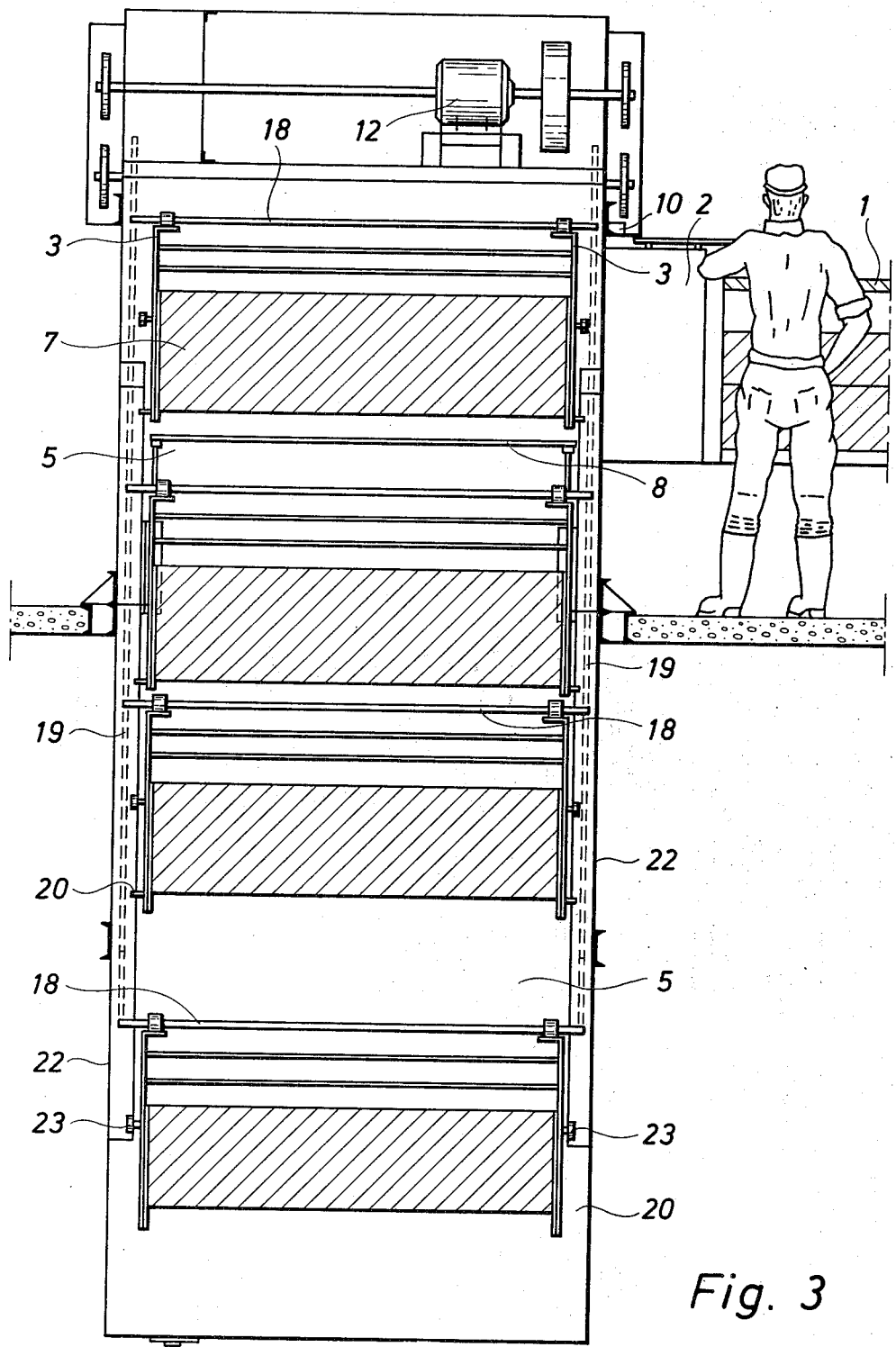
Figure 4:
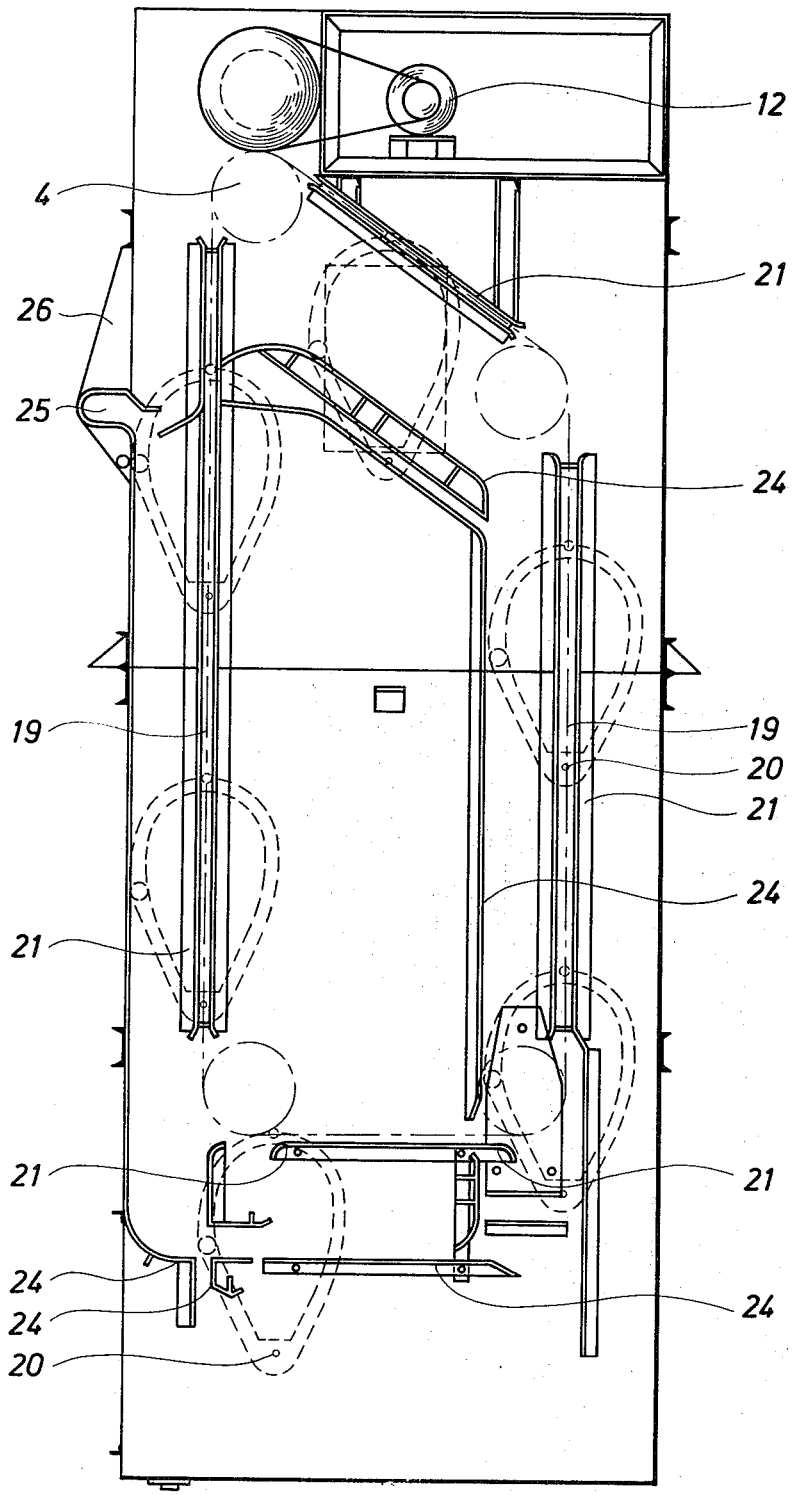
Figure 5:
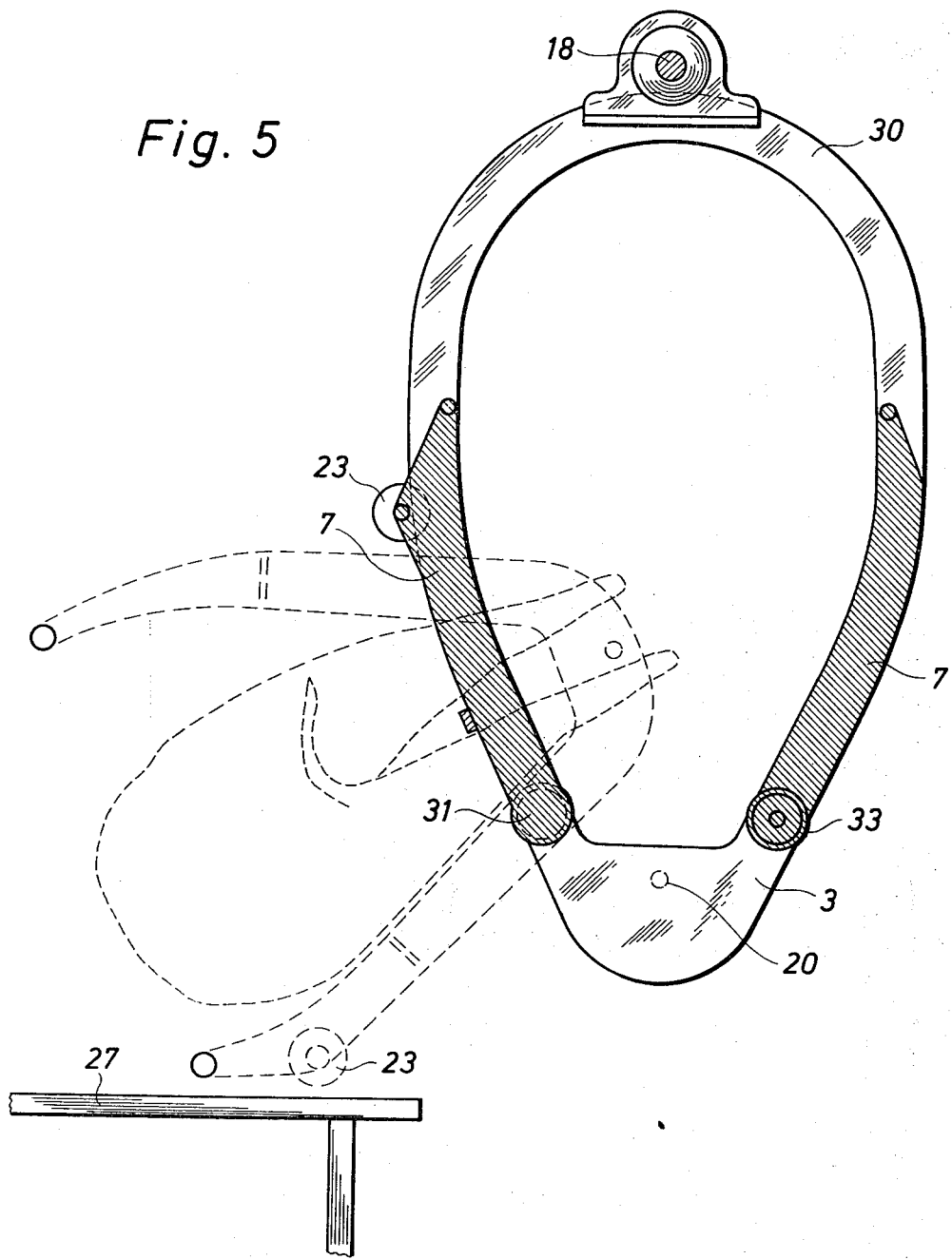

FIG. 1 shows the plant viewed from above,

FIGS. 2, 3, and 4 show vertical sections according to the line II—II, III—III, IV—IV, and FIG. 5 a section through a gondola in a larger scale.

Through a passage 1 the animals are driven forward to an entrance gate 2, through which only one animal at a time gets into the plant. Opposite the gate 2 hangs a gondola in position A on a paternoster elevator 4 placed in a closed anaesthesia chamber 5. Each gondola has interconnected, obliquely positioned sides 7 carried in pivots 31 in a pair of strap-shaped gables 30, which by spindles 18 are suspended in each its chain in the elevator 4. In the position shown in FIG. 2 the gondola sides 7 are supported by a pair of support rolls 33 in each gable 30, see also FIG. 5.

Opposite the gate 2 is placed on a pin 32 a tiltable gangway 8 which by two pressure cylinders 9 are held in horizontal position 8' as long as the gate 2 is not forced to lock.

When an animal from the gate 2 has come out on the gangway 8' forming the bottom of the gondola in position A, and the gate next is manually made to lock, this will switch on a current actuating a valve which takes off the pressure of the cylinders 9 whereby the gangway 8 is swung down in its oblique position shown by 8''. Hereby the animal 34 standing on the gangway is lowered till its flanks rest on the oblique sides 7, the animal thereby losing its footing. At the same time, the elevator 4 is automatically set in motion by an electromotor not shown, which is automatically stopped when all the gondolas have advanced on position, i.e., that the said gondola in position A is passing down to position B. When this gondola on its way is passing a switch 13, an electric current is switched on whereby again pressure is pumped into the cylinders 9 so that the gangway 8 is raised once again to the position shown in FIG. 2.

During the motion of the elevator the gate 2 is kept locked whereupon the gate again can be opened manually, and another animal is let into the plant.

Each gable 30 carries externally a pivot 20, which during the whole circuit is conducted in firm tracks — or guide rails 21 fixed to the end gables 22 of the chamber. Thereby the gables will at any time be kept in a vertical position. Each gondola 7 carries guide rolls 23 running in guide rails 24 which are also fixed to the inside of the two end gables 22 of the chamber.

The gondola viewed will from position B move towards the positions C and D in the lowest part of the plant, and from there via the position E to the position F, from where the animal in its unconscious state is to be delivered to a table 27 beside the plant.

The delivery is made immediately after the gondola has left the position F as the guide rolls 23 will encounter the guide rails 25 at the delivery opening 26 of the chamber, and when they rolls 23 are carried out under the rails 25, they will force the gondola to swing outwards, as shown by the dotted lines in FIGS. 2 and 5, whereby the animal will slide out on to the table 27 with its back foremost. Here it will be stuck and next hung up in a chain by one of its hind legs.

During the continued motion of the gondola towards the position A past the highest point F' of the chain, the rolls 23 will be withdrawn from the rails 25 and by the top end of the guide rails 24 be carried a little way upwards, whereby they will force back the gondola to its vertical initial position in the gables 30.

As anaesthesia gas is generally used carbon dioxide, and the gas concentration required is maintained by placing an analyzer in the chamber, which constantly will control the gas concentration and automatically ensures a fresh supply of gas. Such analyzers are, however, rather sensitive and not very reliable, to which must be added, that they function rather sluggishly. This will easily result in too large variations in the gas concentration. In the case of this plant, the gas supply is regulated in a more robust manner as the start and stop of the paternoster elevator 4 opens and closes a magnet valve which thereby is dosing automatically a definite quantity of gas, equivalent to an animal's consumption, into the gas chamber through a tube 29, which is running along the track in which the head of the animal is moving during the conveyance down into the plant. The tube is part of one of the guide rails 21 and has openings 10 opposite the head of the animal when it is in the positions B and C, but, incidentally, the tube can have more holes.

In practice, this has proved to be an easier and more reliable way in which to maintain the gas concentration required at a constant condition with no harmful variations and with no unnecessary gas consumption.

I claim:

1. An anaesthesia plant for animals to be slaughtered, including a two-chained paternoster elevator which discontinuously conveys the animals hanging in traps shaped as troughs through a pit-shaped gas chamber and delivers the anaesthetized animal beside an exit, the improvement comprising means for suspending each gondola in its entirety on pivots in the one side of a pair of gables, said gables being constantly held in a vertical position, and each being suspended in one out of two elevator chains, said gondola having means for controlling its angular position in space.

2. A plant according to claim 1, wherein each gable includes a fixed stop to support the gondola in its active position.

3. A plant according to claim 2, further comprising a firm guide means for determining the position of the gondola, said guide means at the place of delivery having the shape of a pocket in which the pivot of the gondola is engaged at the motion of the trap upwards towards its highest position, wherein the gondola as a result of its pivot falling into the pocket, is swung out for delivery of the anaesthetized animal, and wherein the pivot is drawn out again at the motion of the gondola away from the pocket, and the pivot following the firm guides turns the gondola back to its active position immediately prior to the gables bringing the gondola to its initial position.

4. A plant according to claim 3, wherein each gable carries pivots which are conducted in firm guides on the inside of the gables of the chamber so that the gondolas during the entire cycle are maintained in a vertical position.

5. A plant according to claim 4, further comprising a common gangway for all the gondolas placed opposite the entrance of the plant, said gangway having a first horizontal position which provides a floor of the gondola in the initial position opposite the entrance gate, said gangway later, at the closing of the entrance gate, being made to tilt downwards so that the animal is smoothly lowered and comes to rest with its flanks against the sides of the trough-shaped gondola, wherein in losing its footing the animal is fixed as in a trap.

6. A plant according to claim 5, further comprising gas escape openings, placed along the track of the head of the animals, said openings being automatically fed with a dose of gas, preferably carbon dioxide, when an animal enters the plant.

7. A plant according to claim 6, wherein the gas escape openings are arranged in a tube which is a part of or is built together with that part of the firm guide for the gable pivots which is on the side of the chamber in which the gondolas move downwards.

8. A plant according to claim 7, wherein the openings preferably are located at the places in the chamber where the heads of the animals are located during the stopping periods of the elevator.

* * * * *